US011720680B2

(12) United States Patent
Mitter

(10) Patent No.: US 11,720,680 B2
(45) Date of Patent: *Aug. 8, 2023

(54) METHODS AND SYSTEMS FOR IMPLEMENTING AUTOMATED CONTROLS ASSESSMENT IN COMPUTER SYSTEMS

(71) Applicant: THE BANK OF NEW YORK MELLON, New York, NY (US)

(72) Inventor: Uddipt Mitter, Pune (IN)

(73) Assignee: THE BANK OF NEW YORK MELLON CORPORATION, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,334

(22) Filed: Dec. 1, 2021

(65) Prior Publication Data

US 2022/0138323 A1 May 5, 2022

Related U.S. Application Data

(63) Continuation of application No. 16/838,681, filed on Apr. 2, 2020, now Pat. No. 11,210,401.

(30) Foreign Application Priority Data

Feb. 7, 2020 (IN) .............................. 202011005379

(51) Int. Cl.
*G06F 21/57* (2013.01)

(52) U.S. Cl.
CPC ........ *G06F 21/57* (2013.01); *G06F 2221/034* (2013.01); *G06F 2221/2101* (2013.01)

(58) Field of Classification Search
CPC ............... G06F 21/57; G06F 2221/034; G06F 2221/2101
See application file for complete search history.

(56) References Cited

U.S. PATENT DOCUMENTS

| 9,608,931 | B2 | 3/2017 | Sharma | |
|---|---|---|---|---|
| 10,360,203 | B2 | 7/2019 | Bhatnagar | |
| 10,599,670 | B2 | 3/2020 | Peng | |
| 11,210,401 | B2 * | 12/2021 | Mitter | ..................... G06F 21/57 |
| 2005/0119961 | A1 | 6/2005 | Tanzillo | |
| 2015/0324713 | A1 | 11/2015 | Haas | |
| 2019/0236661 | A1 | 8/2019 | Hogg | |
| 2019/0354622 | A1 | 11/2019 | Sheldon | |

* cited by examiner

*Primary Examiner* — Beemnet W Dada
(74) *Attorney, Agent, or Firm* — Pillsbury Winthrop Shaw Pittman, LLP

(57) ABSTRACT

Methods and systems are described for implementing automated controls assessment through an application programming interface ("API") driven software development kit. For example, the system may receive a response from an API-based agent to an automated controls assessment audit. The system may process the response, using a library of reusable features for controls assessment audits for a plurality of computer domains, to generate a result of the automated controls assessment audit. The system may then generate an outcome of the first automated controls assessment audit.

20 Claims, 9 Drawing Sheets

Operationalize 120

Select the verification criteria

Mode of Assessment* ⦿ Automated ◯ Manual

Do you want to subscribe assessment results?* ⦿ Yes ◯ No

Control Name*

Terminated user ID Check in AD

| Criteria | DomainName |
| --- | --- |
| | ComId |
| | TerminationDate |
| Filter Ex | DomainName |
| domainN | AccountActiveStatus |
| | Status | abcoooooo.com

[Add Entry]

[Cancel] [Apply]

FIG. 1B

Rule Repository / Save Rule

130

Assignment Agent Name*

Segregation of duties sailpoint check

Assignment Rule Name*

Enter the assessment rule name

Rule*

Enter the rule

Rule Description*

Enter the rule description

Application Mnemonic 1*  Excluded Application Mnemonic List 1  Excluded Entitlement List 1  Application Mnemonic 2

Excluded Application Mnemonic List 2  Excluded Entitlement List 2  Entitlement List 2  Component Type*

Add another rule data

Create  Cancel

FIG. 1C

METHODS AND SYSTEMS FOR IMPLEMENTING AUTOMATED CONTROLS ASSESSMENT IN COMPUTER SYSTEMS

CROSS-REFERENCE TO RELATED APPLICATIONS

The present application is a Continuation Application of U.S. Ser. No. 16/838,681 filed on Apr. 2, 2020, the subject matter of which is incorporated herein by reference in its entirety. This application claims priority to India Patent Application No. 202011005379 filed Feb. 7, 2020, the subject matter of which is incorporated herein by reference in entirety.

FIELD OF THE INVENTION

The invention relates to implementing automated controls assessment in computer systems.

BACKGROUND

Information and data storage systems are increasingly growing complex. Computer systems are no longer limited to individual controls and instead may span numerous domains across computer networks, the Internet, or operating systems. Furthermore, enterprises that incorporate computer systems having numerous domains increasingly also have multiple lines of business. Each line of business may have unique risks factors that may be derived from a plurality of regulatory, technological, or business practice sources particular to that line of business. Ensuring the security and operational readiness of the computer system of these enterprises is thus a difficult process as the security and operational readiness must account for the diverse domains of the computer system, the multiple lines of business of the enterprise, and the risk factors particular to each of those lines of business.

SUMMARY

Methods and systems are described herein for improvements to controls assessments in computer systems. For example, in order to maintain security and operational readiness of computer systems, enterprises must be able to determine potential risks to the computer system. One technique for assessing risk is to determine the operating effectiveness of a control in a computer system. For example, an audit on a computer system control may test whether the control is operating as designed and whether a system responsible for the control possesses the necessary authority, ability, and/or competence to perform the control effectively. In such cases, the computer system executes a systematic and logical rule set to determine whether systems of an enterprise, including its detailed information technology processes, controls, and activities, achieve the programmed information technology ("IT"). As opposed to other computer systems, computer auditing is particularly sensitive to the specialization of computer systems (both on an application and hardware level) as the computer auditing system not only needs to operate precisely, but it must also must determine whether or not another specialized computer system is operating precisely.

Thus, generating an accurate assessment of control operating effectiveness in computer systems requires a controls assessment audit that is particular to each of the diverse domains of the computer system, lines of business of the enterprise, and the risk factors particular to each line of business. For example, each domain may use a different platform and each line of business may have different rule sets that must be audited. To account for this, conventional control operating effectiveness may be achieved through the implementation of controls assessments that are designed for each of these audited areas (e.g., each domain, line of business, etc.). By designing each assessment based on the audit area, the assessment can ensure that the assessment may be executed on the infrastructure of the audited area and incorporate the necessary rule set specific to the audited area.

In addition to being time and labor intensive to program controls assessment audits specific to each of these areas, independently implemented solutions for these audited areas prevent real-time monitoring of the control operating effectiveness of the system, thus resulting in an incomplete risk measurement. For example, the use of controls assessment audits created for each audited area leads to inefficient data collection, bottlenecks to access a data set, and processing burdens on the computer system. Accordingly, computer systems must rely on manual solutions to monitoring the control operating effectiveness of a given computer system. These manual solutions may include the use of reminder notifications to trigger assessments of a specific area to be audited, escalation of workflows for potentially risky areas, etc.

In view of the above, the methods and systems are described herein implementing automated controls assessments that may overcome the problems inherent to conventional solutions through an application programming interface ("API") driven software development kit. For example, the automated controls assessment system described herein reduces the burden of evidence collection for controls assessment audits and allows for proactive monitoring for, and alerting of, potential issues. The system uses a control assessment software development kit that provides standard assessment features, while core and/or business logic specific to particular areas of audit are provided by individual APIs. By using a control assessment software development kit that provides these standard assessment features, the system allows a control manager for the system to provide a user interface with standardized assessments results (thus providing system-wide coordination of all audits) as well as allow users to control the testing logic for a given controls assessment audit (thus providing the specialization needed for computer auditing). For example, the system may coordinate individual audits and automate the monitoring of different audit areas. Moreover, by using APIs that include the core and/or business logic specific to particular areas of audit, the system can perform "one-stop" automated control assessments across the diverse audit areas.

As the automated controls assessment system is enabled to conduct audits across diverse areas of audit, the system may provide further efficiencies by reporting results of the individual audits in a standardized format. The standardized format allows for the system to coordinate the various audits as well as to compile results. As part of this compiling, the results, which may number in the tens of thousands of records, may be stored more efficiently by combing the results for a given record and/or de-duplicating identical results. This efficient storing not only reduces the burden of storing the tens of thousands of records, but it also reduces the burden of the metadata (e.g., describing a deviation, information about the source of the deviation, information about affected systems, information about responsible parties, and/or information used to resolve the issue). This efficiently stored information may then be presented in a coordinated manner that allows for the tracking, monitoring, and/or sharing of the results with numerous other applications.

Moreover, the automated controls assessments described herein provide for federated use of controls assessment. For example, in some embodiments, the system may enable federated development of automated controls assessments such that API-based agents may be developed for deployment on a given infrastructure, irrespective of the infrastructure of the control manager. Given the standardized format of API-based agents responses, the system is still able to collect, compile, and/or generate results based on those responses. In another example, in order to reduce the burden of numerous API-based agents repeatedly querying the system, users of the system may subscribe to specific assessment results (e.g., corresponding to particular domains, lines of business, and/or applications). Accordingly, users may receive particular assessment results based on global assessment results. In another example, the system may enable API-based agents to be dynamically updated. More specifically, the development kit may include a specialized field which manages dynamic rendering of front end developer features. Accordingly, API-based agents may be dynamically updated without the need to wait for front end features to be created to support the dynamic updates. In yet another example, the system supports post-processing features for the collection, comparison, and/or resolution of issues identified in the results of one or more controls assessment audits. Accordingly, related issues identified in the results of multiple controls assessment audits may be resolved in a coordinated manner.

In one aspect, methods and systems are disclosed herein for implementing automated controls assessment through an application programming interface ("API") driven software development kit. For example, the system may receive at a first instance of a user interface of a control manager application, a first user input initiating a first automated controls assessment audit of a first audit area. The system may determine a first domain of a plurality of computer domains corresponding to the first audit area. The system may determine a first API-based agent of a plurality of API-based agents corresponding to the first domain for performing the first automated controls assessment audit. The system may receive a first response, from the first API-based agent, to the first automated controls assessment audit. The system may process the first response, using a library of reusable features for controls assessment audits for the plurality of computer domains, to generate a first result of the first automated controls assessment audit. The system may then generate for display, on a display device, a second instance of the user interface, wherein the second instance comprises the first result, wherein the first result comprises an outcome of the first automated controls assessment audit.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIGS. 1A-D shows illustrative instances of a user interface for implementing automated controls assessment, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

FIGS. 1A-D show illustrative instances of a user interface for implementing automated controls assessment, in accordance with one or more embodiments. For example, using the user interface shown in FIGS. 1A-D, the system may provide control assessment audits across diverse configurations and data sources. In particular, the system may provide proactive alerts before control or non-compliance issues occur. As described herein, the system may report on multiple operational and IT process areas using a uniform governance layer. The system may also coordinate audits. In particular, the system may assess data sources and perform audits and reuse the results across different domains. It should be noted that in some embodiments, the instances of FIGS. 1A-D may be combined.

Figure 1A:
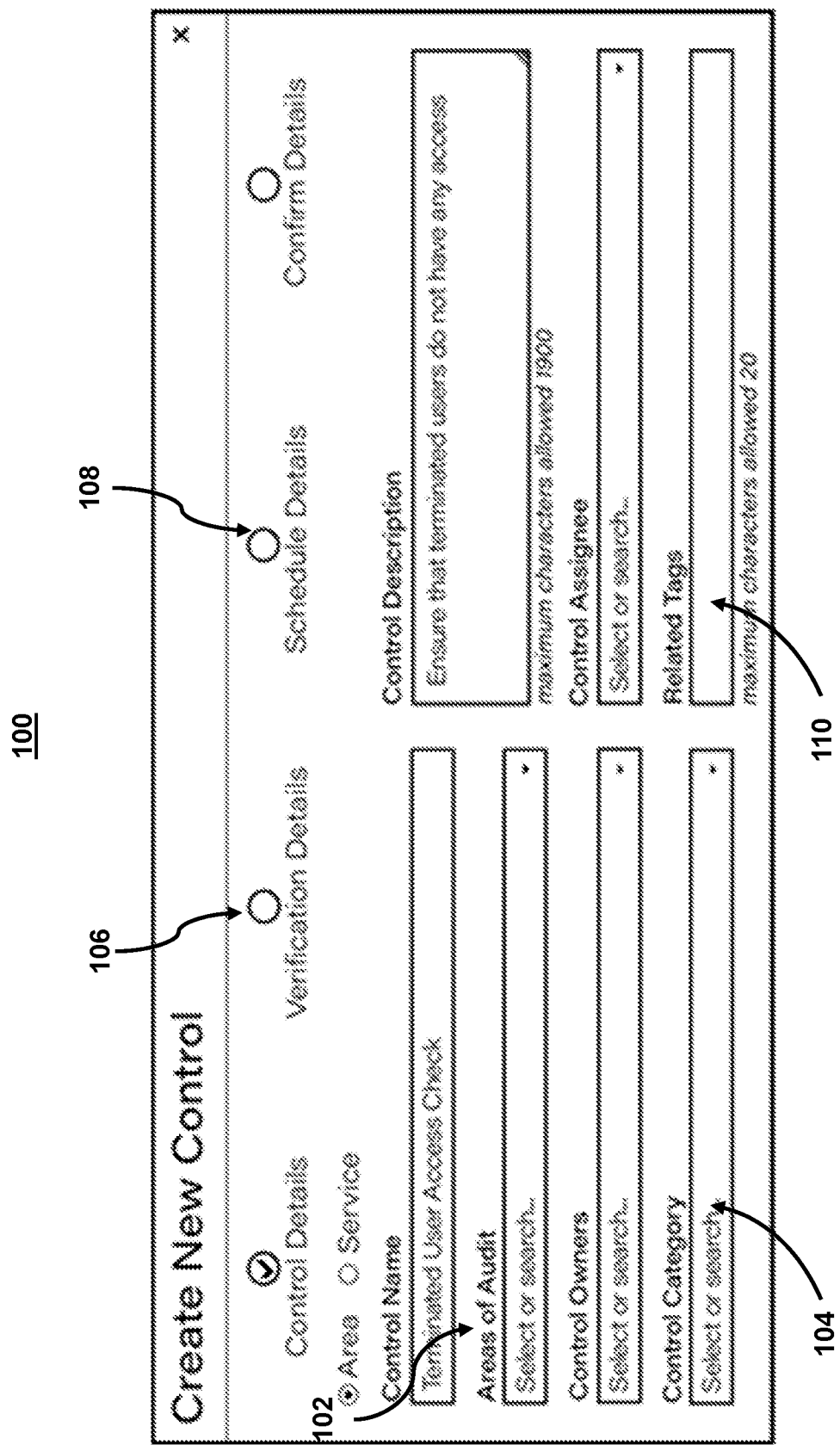

FIGS. 1A-D include multiple instances of a user interface. FIG. 1A includes instance 100. For example, instance 100 includes multiple options for initiation of a controls assessment audit and/or create automated controls assessments. For example, option 102 may allow user to select an area of audit. The area of audit may comprise a particular domain (e.g., an Internet domain, network domain, operating system domain, technology domain, etc.) and/or a particular line of business. The domain may in some embodiments be based on any criteria that distinguishes it from another domain. The system may also allow users to select the verification details of an automated controls assessment audit. For example, the verification details (e.g., via option 106) may indicate particular audits that may be performed, particular API-based agents that may be used, and/or any other details related to the audit. The system may also allow users to select the scheduling details (e.g., via option 108) of an automated controls assessment audit. For example, the scheduling details may include scheduling data that may be used to determine a time, frequency, trigger, and/or other event that initiates an automated controls assessment audit. The system may also allow users to select a control category (e.g., via option 104) of an automated controls assessment audit. For example, the control category may group multiple automated controls assessment audits into various categories that may be executed.

Instance 100 also includes tag 110. For example, the system may receive, at a first instance of a user interface (e.g., instance 100), a user input subscribing to a first domain for a first automated controls assessment audit. In response to the user input, the system may identify a tag (e.g., tag 110) corresponding to the first domain. For example, the first domain may be determined to correspond to the first audit area based on the tag. For example, in order to reduce the burden on the system of having numerous API-based agents repeatedly processed, the system may allow users to subscribe to specific assessment results (e.g., corresponding to particular domains, lines of business, and/or applications). The users may then receive assessment results based on global assessment results in response to the system identifying the tag in the results.

FIG. 1B includes instance 120. Instance 120 is another illustrative instance of a user interface in which the system may at a first instance of a user interface (e.g., instance 120), a user input subscribing to a first domain for a first automated controls assessment audit. In response to the user input, the system may identify a tag (e.g., tag 110) corresponding to the first domain. For example, as shown in instance 120, the system may receive a name of a controls assessment and then receive subsequent criteria for setting a tag in the select controls assessment and/or filters to be applied. In some embodiments, the system may receive criteria such as a specified domain, time period, status, and/or other criteria as described in relation to instance 150 below.

FIG. 1C includes instance 130 in another illustrative instance of a user interface. For example, as shown in instance 130, the system may receive modification (e.g., dynamic updates) to a rule set (e.g., as described below in relation to FIG. 6). For example, the system may receive an edit to the rule set that is used for the controls assessment audit. The edit may specify the control assessment logic and/or condition which needs to be evaluated to generate a given response. For example, the system may generate a response indicating a "Pass" or "Fail" of the assessment. Additionally or alternatively, the system may define how a deviation (e.g., a record that does not pass an assessment) is defined. For example, the deviation may be defined by different categories of information. For example, for a terminated user ID assessment audit, the employee ID (e.g., "XB12345") that fails the audit may be displayed with the domain in which it failed. The deviation is then express as a combination of employee ID and the domain.

Figure 1D:
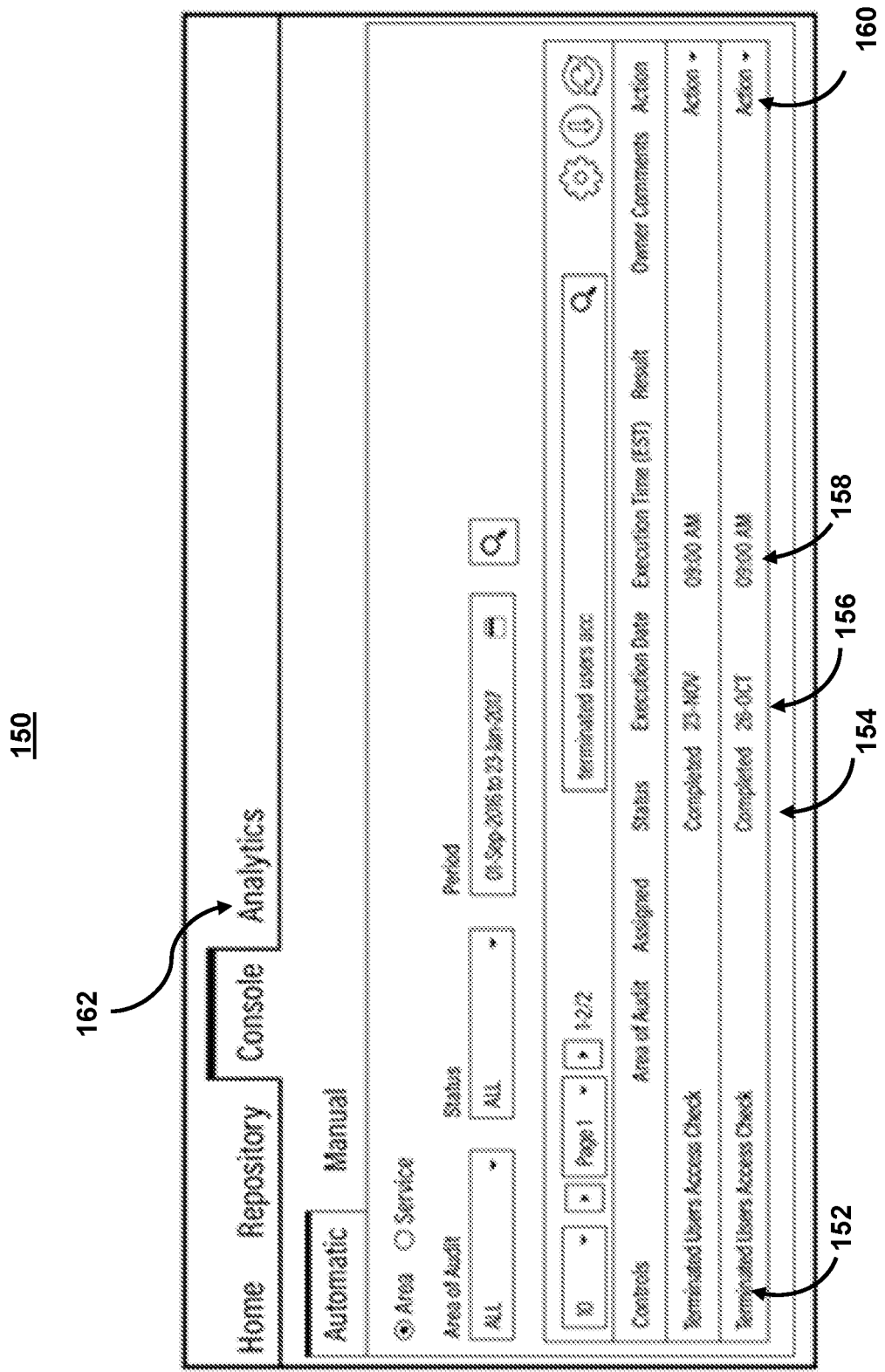

FIG. 1D includes instance 100. The system may generate for display additional instances of the user interface. Furthermore, in some embodiments, the user interface may combine options and information displayed on one or more instances. Instance 150 is another instance of the user interface. In instance 150, the user interface may display one or more results of one or more automated control assessment audits. For example, instance 150 may include listing 152, which includes automated control assessment audits and their progress. For example, text 154 indicates that listing 152 is currently complete. Date 156 and time 158 indicate the respective data and time at which the audit was complete. Finally, action 160 indicates current status and/or actions that may be performed.

In some embodiments, the system may generate advanced analytics of one or more assessment results (e.g., via option 162). For example, the system may track one or more audits and/or the results of the one or more audits. This information may be compiled into graphical formats. Additionally or alternatively, the system may provide post-processing features that allow data to be assessed and the results to be reused across different domains. For example, a result from one audit may be compared to the result of another audit. For example, a result may include a deviation (e.g., a record that does not pass an assessment). The system may track information about the deviation and/or deviations that appear across different audits. Deviations that correspond as well as the information related to those deviations (e.g., date, responsible issue, responsible party for resolving, etc.) may be compiled into a single record. The system may then export the single record (e.g., as a spreadsheet or other data structure) for processing.

The system may generate for display additional instances of the user interface. Furthermore, in some embodiments, the user interface may combine options and information displayed on one or more instances. For example, it should be noted that in some embodiments one or more features of one instance of the user interface may be combine with another (e.g., in order to increase the user experience). For example, the user interface may combine information and features in order to streamline the development process and/or initiation of a given controls assessment audit. This may in some embodiments include provided information related to similar functions and/or features on a single instance and/or transitioning through different instances using a predetermined feature tree and/or hierarchical structure.

Figure 2:
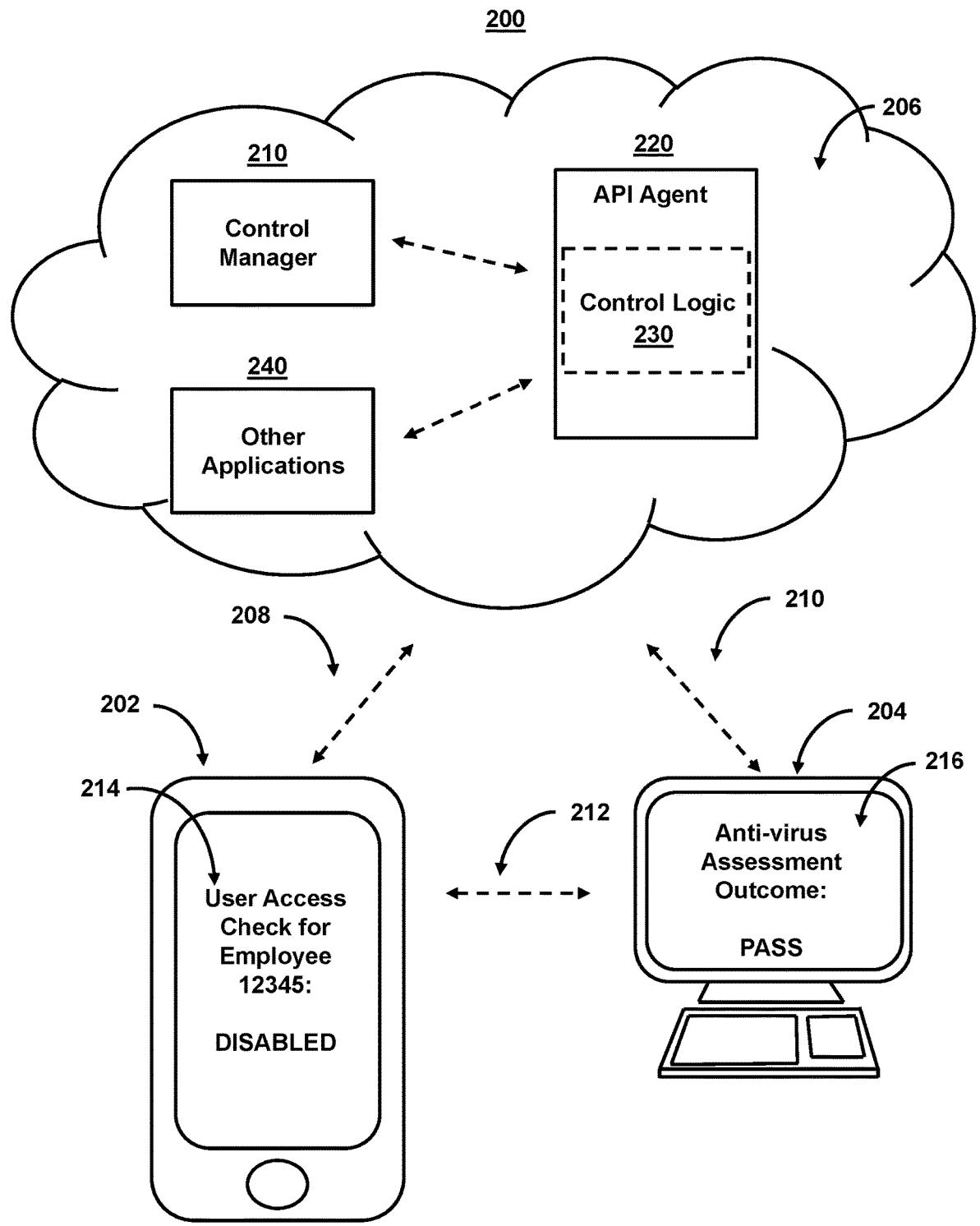
FIG. 2 shows an illustrative system diagram for implementing automated controls assessment, in accordance with one or more embodiments.

FIG. 2 shows an illustrative system diagram for implementing automated controls assessment, in accordance with one or more embodiments. As shown in FIG. 2, system 200 may include user device 202, user device 204, and/or other components. Each user device may include any type of mobile terminal, fixed terminal, or other device. For example, each of these devices may comprise one or more of the devices shown in FIGS. 1A-D. Each of these devices may receive content and data via input/output (hereinafter "I/O") paths and may also include processors and/or control circuitry to send and receive commands, requests, and other suitable data using the I/O paths. The control circuitry may be comprised of any suitable processing circuitry. Each of these devices may also include a user input interface and/or display for use in receiving and displaying data (e.g., user interface 102 (FIGS. 1A-D)).

For example, in some embodiments, the system may comprise cloud-based storage circuitry configured to store a library of reusable features for controls assessment audits for a plurality of computer domains. The system may additionally comprise cloud-based control circuitry configured to receive, at a control manager application, a first user input initiating a first automated controls assessment audit of a first audit area, and determine, at the control manager application, a first domain of the plurality of computer domains corresponding to the first audit area. The cloud-based control circuitry may further be configured to determine, at the control manager application, a first API-based agent of a plurality of API-based agents corresponding to the first domain for performing the first automated controls assessment audit, and receive, at the control manager application, a first response, from the first API-based agent, to the first automated controls assessment audit. Finally, the cloud-based control circuitry may be further configured to process, at the control manager application, the first response using the library of reusable features to generate a first result of the first automated controls assessment audit. The system may also include cloud-based I/O circuitry configured to generate for display, on a display device (e.g., user device 202 (FIG. 2)), a first instance of a user interface (e.g., interface 110 (FIGS. 1A-D)) comprising an option (e.g., option 102 (FIGS. 1A-D)) for selecting the first audit area and/or an option for initiating the first automated controls assessment audit, and generate for display, on the display device, a second instance of the user interface (e.g., instance 150 (FIGS. 1A-D)) comprising the first result (e.g., result 158 (FIGS. 1A-D)), wherein the first result comprises an outcome of the first automated controls assessment audit.

Users may, for instance, utilize one or more of the user devices to interact with one another, one or more servers, or other components of system 200. It should be noted that, while one or more operations are described herein as being performed by particular components of system 200, those operations may, in some embodiments, be performed by other components of system 200. As an example, while one or more operations are described herein as being performed by components of user device 202, those operations may, in some embodiments, be performed by components of user device 204. System 200 also include cloud-based components 206, which may have services implemented on user device 202 and user device 204, or be accessible by communication paths 208 and 210, respectively.

Cloud-based components 206 may include control manager 210, API-based agent 220, which itself may include control logic 230, and/or other application 240. It should be noted that in some embodiments, one or more of cloud-based components 206 may not in fact be cloud-based. Control manager 210 may include features used to coordinate and execute controls assessment audits. For example, control manager 210 may generate a user interface that includes one or more instances (as shown in FIGS. 1A-D). As described in FIGS. 1A-D, the user interface may allow a user to coordinate controls assessment audits, schedule audits, and/or review and analyze results. For example, control manager 210 may allow a user to access a result (e.g., result 216) of a control assessment audit on a user device (e.g., user device 204).

System 200 may also include a plurality of API-based agents. The plurality of API-based agents (e.g., API-based agent 220) may be generated using an API driven software development kit. For example, each of the plurality of API-based agents may be created using a standardized software development kit. For example, control manager 210 may be configured to receive information (e.g., feature references, evidence, assessments, etc.) in a format standardized by a standard assessment features of the software development kit. For example, the development kit may include an abstraction layer that provides consistent interfaces for feature development (e.g., logging, analytics, network, security). The development kit may include a set of platform capabilities that dictate how a third-party may write code, how the code should be structured, and how the code gets surfaced in the application.

API-based agent 220 may include control logic 230, which may be specific to API-based agent 220. For example, as described below, control logic 220 may define how a given control assessment audit is executed. For example, control logic 220 may generate responses based on features specific to the API-based agent that relate to or include evidence collection, control assessment rule sets, data libraries, action response assignments, or aggregation indicators in results.

In some embodiments, the system may enable API-based agents to be dynamically updated through modifications to control logic 230. For example, the development kit may include a specialized field which manages dynamic rendering of front end developer features. For example, an edit to a value attribute, name, or rule set of the API-based agent may be dynamically updated as shown in a user interface (e.g., as described in FIGS. 1A-D). Accordingly, the system may be dynamically updated without the need for updates to back end features to have corresponding updates to front end features.

For example, control logic 230 may control the operations of the API-based agents (which may act as independent programs). Control logic 230 responds to commands (e.g., instructions transmitted from control manager 210) and/or performs automated tasks that have been structured into the API-based agent. In some embodiments, control logic 230 may also incorporate business logic that encodes the real-world business rules that determine how data can be created, stored, and changed. For example, the business rules may encode rules that are specific to a particular line of business and/or domain.

In some embodiments, the software development kit upon which API-based agent 220 is based may be in the form of libraries of reusable functions used to interface with one or more programming languages and/or infrastructure. The development kit may include hardware-specific tools that can communicate with a particular embedded system (e.g., one or more data sources and/or hardware infrastructures).

Each of these devices may also include memory in the form of electronic storage. The electronic storage may include non-transitory storage media that electronically stores information. The electronic storage of media may include (i) system storage that is provided integrally (e.g., substantially non-removable) with servers or client devices and/or (ii) removable storage that is removably connectable to the servers or client devices via, for example, a port (e.g., a USB port, a firewire port, etc.) or a drive (e.g., a disk drive, etc.). The electronic storages may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 2 also includes communication paths 208, 210, and 212. Communication paths 208, 210, and 212 may include the Internet, a mobile phone network, a mobile voice or data network (e.g., a 4G or LTE network), a cable network, a public switched telephone network, or other types of communications network or combinations of communications networks. Communication paths 208, 210, and 212 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

In some embodiments, the components in system 200 may work in concert to generate results (e.g., result 214 or result 216). For example, client manager 210 may call API-based agent 220 querying how many control issues were identified for terminated users who did not have their system access revoked. API-based agent 220 may poll multiple data sources to collect the information and publish the output as a response. For example, API-based agent 220 may execute control logic (e.g., business logic) as programmed into API-based agent 220. The system may provide other standard assessment features using standardized assessment logic that is standardized across the API-based agents. The standardized assessment logic may be enforced by the software development kit and thus the control logic may be used to filled into an API-based template for API-based agents of the system.

API-based agent 220 (e.g., in an "async" mode) may publish the response to control manager 210 via an endpoint associated with control manager 210. Content manager 210 may use the control testing functionality from API-based agent 220 and apply a governance layer. The governance layer may allow the system to generate a result to and display the result in a user interface (e.g., result 216). Alternatively or additionally, API-based agent 220 (e.g., in a "sync" mode) may publish the response to its endpoint from which other applications (e.g., other application 240) may access and consume the response. For example, other application 240 may incorporate other functionality (e.g., chatbot functionality) to provide updates on a controls assessment audit and/or identified result. For example, other application 240 may use the control testing functionality from API-based agent 220 and apply a conversational user interface.

Figure 3:
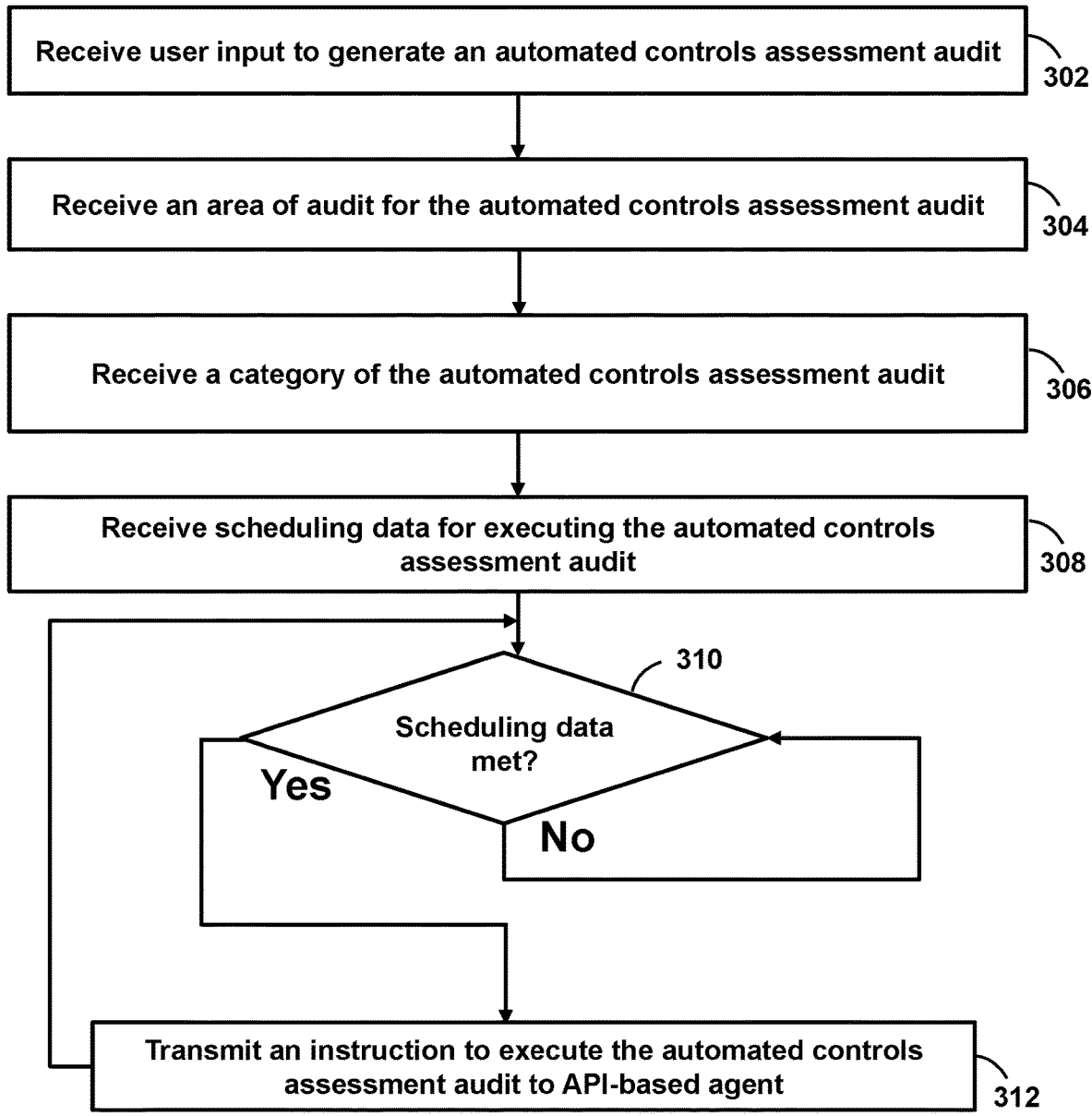
FIG. 3 shows a flowchart of the steps involved implementing automated controls assessment using a control manager that accesses API-based agents, in accordance with one or more embodiments.

FIG. 3 shows a flowchart of the steps involved implementing automated controls assessment using a control manager that accesses API-based agents, in accordance with one or more embodiments. For example, process 300 may represent the steps taken by one or more devices as shown in FIG. 2, via one or more instances of a user interface as shown in FIGS. 1A-D, when transmitting an instruction to execute the automated controls assessment audit to an API-based agent. Moreover, the instruction may be received by an API-based agent and processed using process 400 as described in FIG. 4.

At step 302, process 300 receives (e.g., using control circuitry of one or more components of system 200 (FIG. 2)) a user input to generate an automated controls assessment audit. For example, a user accessing control manager 210 may generate an automated controls assessment audit (e.g., via instance 100 (FIGS. 1A-D)). The automated controls assessment audit may provide proactive alerts before weakening of controls or non-compliance.

At step 304, process 300 receives (e.g., using control circuitry of one or more components of system 200 (FIG. 2)) an area of audit for the automated controls assessment audit. For example, the system may receive a user input to option 102 (FIGS. 1A-D)). The system may then apply the automated controls assessment audit to the selected area of audit.

The system may also provide drop down indicates of available audits for the area of audit as well as status and outstanding issues.

At step 306, process 300 receives (e.g., using control circuitry of one or more components of system 200 (FIG. 2)) a category of the automated controls assessment audit. For example, the system may receive a user input to option 104 (FIGS. 1A-D)). The selected category may indicate the available automated controls assessment audits and/or may group audits by function, domain, and/or application.

At step 308, process 300 receives (e.g., using control circuitry of one or more components of system 200 (FIG. 2)) scheduling data for executing the automated controls assessment audit. For example, the system may receive a user input to option 108 (FIGS. 1A-D)).

At step 310, process 300 determines whether (e.g., using control circuitry of one or more components of system 200 (FIG. 2)) the scheduling data is met. For example, the system may determine if the scheduled time of the audit corresponds to the current time and/or if a frequency of the audit (e.g., daily, weekly, etc.) corresponds to the amount of time since the last audit.

In response to determining that the scheduling data is met, process 300 continues to step 312. In response to determining that the scheduling data is not met, process 300 returns to step 310 and iteratively determines whether or not the scheduling data is met. For example, if the current time does not correspond to the scheduled time, the system may iteratively check until the scheduled time is met.

At step 312, process 300 transmits (e.g., using control circuitry of one or more components of system 200 (FIG. 2)) an instruction to execute the automated controls assessment audit to an API-based agent. For example, the instruction may be received by an API-based agent. The API-based agent may then process the instruction to generate a result to the automated controls assessment audit.

It is contemplated that the steps or descriptions of FIG. 3 may be used with any other embodiment of this disclosure. In addition, the steps and descriptions described in relation to FIG. 3 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 could be used to perform one or more of the steps in FIG. 3.

Figure 4:
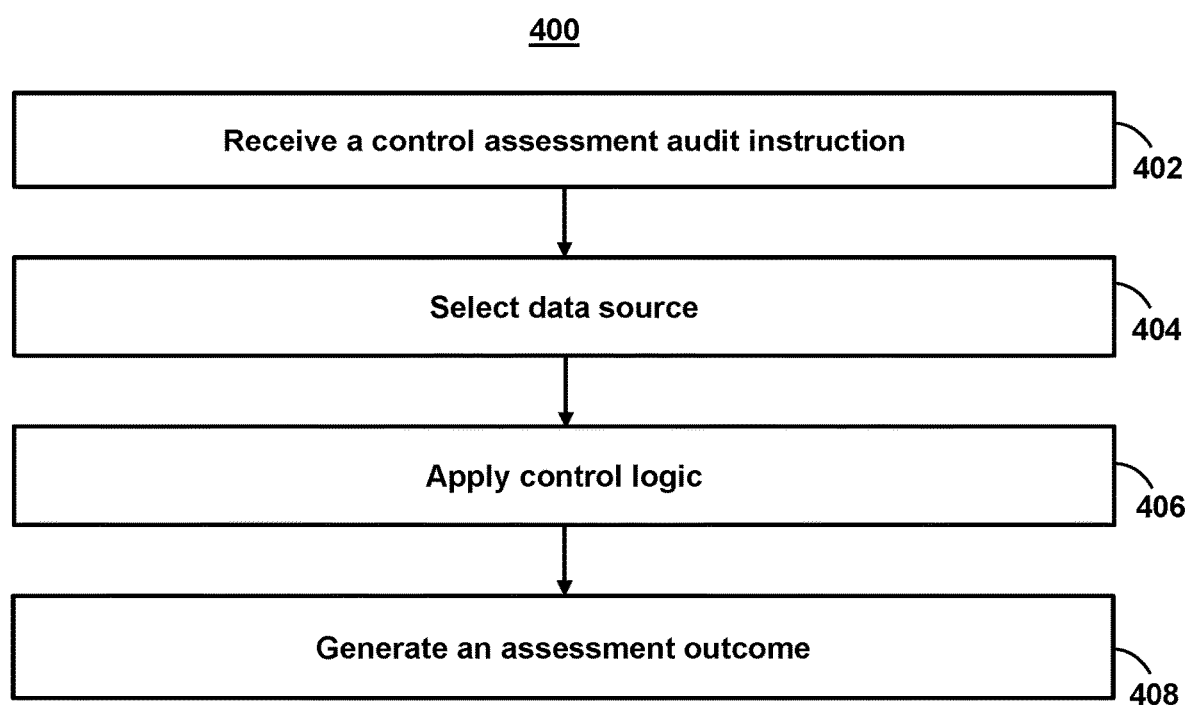
FIG. 4 shows a flowchart of the steps involved in generating an assessment outcome using API-based agents, in accordance with one or more embodiments.

FIG. 4 shows a flowchart of the steps involved in generating an assessment outcome using API-based agents, in accordance with one or more embodiments. For example, process 400 may represent the steps taken by one or more devices as shown in FIG. 2 when an API-based agent responds to an instruction to execute an automated controls assessment audit as described in FIG. 3.

At step 402, process 400 receives (e.g., using control circuitry of one or more components of system 200 (FIG. 2)) a control assessment audit instruction. For example, the system may receive a request from a control manager based on a receive user input or scheduling data (e.g., as described in FIG. 3). In a first example, the system may generate a controls assessment audit of a terminated user's access. This audit may be performed daily to disable access permissions of terminated employees. In a second example, the system may generate a controls assessment audit of anti-virus software (e.g., using virus signatures that are updated regularly via centralized anti-virus policy management servers) that has been installed on predetermined servers that support access to one or more network. In a third example, the system may generate a controls assessment audit of toxic rule checks (e.g., if a user has access to one domain and/or application the user is prevented from access to another). In a fourth example, the system may generate a controls assessment audit of password complexity (e.g., if a given password for a given user and/or system has the requisite complexity).

At step 404, process 400 selects (e.g., using control circuitry of one or more components of system 200 (FIG. 2)) a data source. For example, the system may select a data source as defined by the API-based agent (e.g., as described in FIG. 6 below). In the user's access example, the system may pull a list of every employee terminated over the last 30 days from a database (e.g., using an SQL query). The system may also, for each employee (e.g., based on an employee ID), retrieve an account status (e.g., indicating whether or not the employee ID corresponds to an employee actively employed) from an activity directory database. In the anti-virus signature example, the system may parse an anti-virus signature feed file, and for every server, retrieve the date when an anti-virus patch was last updated (e.g., based on data available in the file). The system may then use the server name to look up (e.g., in a directory of the system) the details of various applications on the server. In a toxic rule check example, the system may pull a first system directory of a first system subject to the toxic rule check. The system may then pull a system directory of the second system subject to the toxic rule check. In the password complexity verification example, the system may retrieve a list of the complexity requirements for a given domain and a hash-value or other metric representing the complexity of a password policy in the given domain.

At step 406, process 400 applies (e.g., using control circuitry of one or more components of system 200 (FIG. 2)) control logic. For example, the system may use control logic as defined by the API-based agent (e.g., as described in FIG. 6 below). In the user's access example, the system determines whether the employee is actively employed (e.g., based on a flag indicating that account status is disabled). In the anti-virus signature example, the system may parse an anti-virus signature feed file, and for every server, retrieve the date when an anti-virus patch was last updated (e.g., based on data available in the file). The system may then use the server name to look up (e.g., in a directory of the system) the details of various applications on the server. In the toxic rule check example, the system may compare the access status of each employee ID in the first system to the access status of each employee in the second system. In the password complexity verification example, the system may compare the hash-value or other metric representing a complexity of each password in the domain directory that corresponds to the password complexity policy. For example, a rule set may indicate that each password must be at least 10 characters and should expire within 15 days. If a domain is configured for a 6 character minimum for passwords, then the password complexity policy in not in compliance.

At step 408, process 400 generates (e.g., using control circuitry of one or more components of system 200 (FIG. 2)) an assessment outcome. In the user's access example, if the system determines that the employee is actively employed (e.g., based on a flag indicating that account status is disabled), then the process has failed (as the employee was terminated). Alternatively if the system determines that the employee is not actively employed (e.g., based on a flag indicating that account status is disabled), then the process has passed. In the anti-virus signature example, if the system determines that there are servers where the last update of the anti-virus software happened more than 15 days ago, the assessment fails for that server and the result is associated to the relevant applications in the server. Alternatively, if the system determines that there are servers where the last update of the anti-virus software happened within 15 days, the assessment may pass. In the toxic rule check example, the system may flag any record that does not pass the comparison of the access status of each employee ID in the first system and the second system (i.e., the employee ID had access to both systems). In the password complexity verification example, the system may generate a task to require password reset operations for the domain, if the password policy for the domain did not have the requisite complexity.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 could be used to perform one or more of the steps in FIG. 4.

Figure 5:
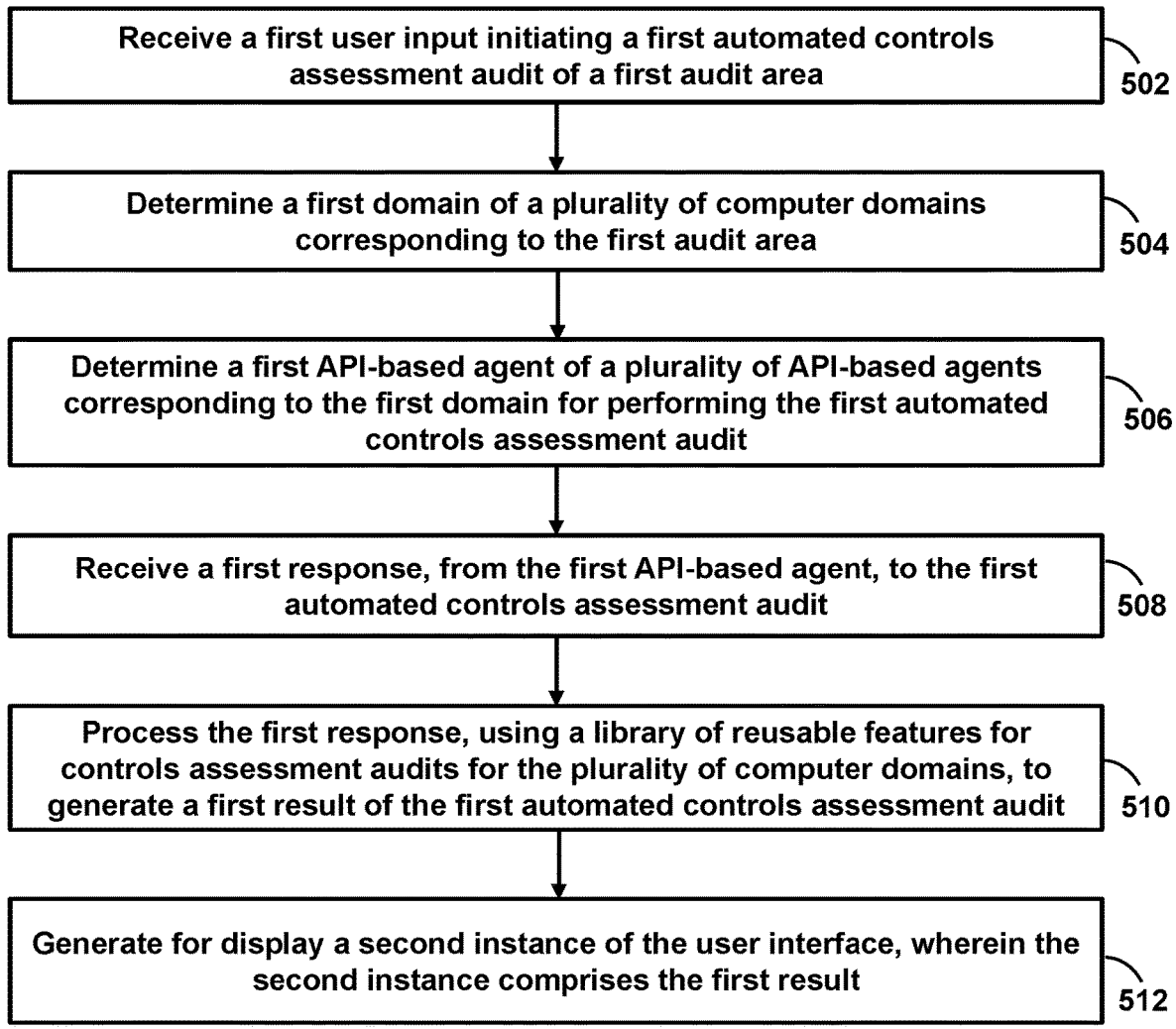
FIG. 5 shows a flowchart of the steps involved in generating results to automated controls assessments through an application programming interface driven software development kit, in accordance with one or more embodiments.

FIG. 5 shows a flowchart of the steps involved in generating results to automated controls assessments through an application programming interface driven software development kit, in accordance with one or more embodiments. For example, process 500 may represent the steps taken by one or more devices as shown in FIG. 2 when implementing automated controls assessments. The automated controls assessments may in some embodiments be initiated via user inputs to one or more instances of a user interface (e.g., as described in FIGS. 1A-D). Furthermore, in some embodiments, process 500 may involve interactions between a control manager (e.g., control manager 210 (FIG. 2)) and an API-based agent (e.g., API-based agent 220 (FIG. 2)) as described in FIGS. 3-4 above.

At step 502, process 500 receives (e.g., using control circuitry of one or more components of system 200 (FIG. 2)), at a first instance of a user interface of a control manager application, a first user input initiating a first automated controls assessment audit of a first audit area. For example, a user may initiate a first automated controls assessment audit using instance 100 as shown in FIGS. 1A-D.

At step 504, process 500 determines (e.g., using control circuitry of one or more components of system 200 (FIG. 2)) a first domain of a plurality of computer domains corresponding to the first audit area. For example, the system may determine a domain and/or area of audit selected using option 102 (FIGS. 1A-D)).

At step 506, process 500 receives (e.g., using control circuitry of one or more components of system 200 (FIG. 2)) determines a first API-based agent of a plurality of API-based agents corresponding to the first domain for performing the first automated controls assessment audit. For example, each of the plurality of API-based agents may be created using a standardized software development kit.

In some embodiments, the system may access a look-up table database to indicate an API-based agent corresponding to the domain and/or area of audit. In some embodiments, the system may further determine the API-based agent based on one or more criteria (e.g., the controls assessment audit required, category of users, manual vs. automated assessment, etc.).

At step 508, process 500 receives (e.g., using control circuitry of one or more components of system 200 (FIG. 2)) a first response, from the first API-based agent, to the first automated controls assessment audit. For example, the first API-based agent may generate the first response based on features specific to the first API-based agent. These features may be related to evidence collection, control assessment rule sets, data libraries, action response assignments, and/or aggregation indicators. In some embodiments, the first API-based agent generates the first response using standardized assessment logic that is standardized for the plurality of API-based agents and control logic that is not standardized for the plurality of API-based agents.

At step 510, process 500 processes (e.g., using control circuitry of one or more components of system 200 (FIG. 2)) the first response, using a library of reusable features for controls assessment audits for the plurality of computer domains, to generate a first result of the first automated controls assessment audit. For example, the system may receive responses from the API-based agents in a standardized response format. The system may in turn generate a result based on the response. Additionally or alternatively, the first response may be generated by the system using standardized assessment logic that is in a first programming language and control logic that is in a second programming language.

At step 512, process 500 generates (e.g., using control circuitry of one or more components of system 200 (FIG. 2)) for display a second instance of the user interface. For example, the second instance may comprise the first result. The first result may comprise an outcome of the first automated controls assessment audit (e.g., as shown in instance 150 (FIGS. 1A-D)).

In some embodiments, the system may perform one or more post-processing steps. For example, the system may support post-processing features for the collection, comparison, and/or resolution of issues identified in the results of one or more controls assessment audits. The system may then identify related issues in the results of multiple controls assessment audits and resolve them in a coordinated manner. For example, the system may receive a second user input initiating a second automated controls assessment audit of a second audit area. The system may then determine a second domain of the plurality of computer domains corresponding to the second audit area. The system may determine a second API-based agent of the plurality of API-based agents corresponding to the second domain for performing the second automated controls assessment audit. The system may receive a second response, from the second API-based agent, to the second automated controls assessment audit; processing the second response, using the library of reusable features for controls assessment audits for the plurality of computer domains, to generate a second result of the second automated controls assessment audit. The system may compare the first result and the second result. The system may then generate for display, on a display device, a third instance of the user interface, wherein the third instance is based on the first result and the second result. For example, the third instance may include a listing of corresponding access management test is run, for each of the results (e.g., indicating a failed test), the system may track the time of the processing, a party responsible for resolving, and/or the use of individual rules (e.g., this issue is required to be fixed within 24 hours, the issue must be resolved by administrator, etc.).

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 could be used to perform one or more of the steps in FIG. 5.

Figure 6:
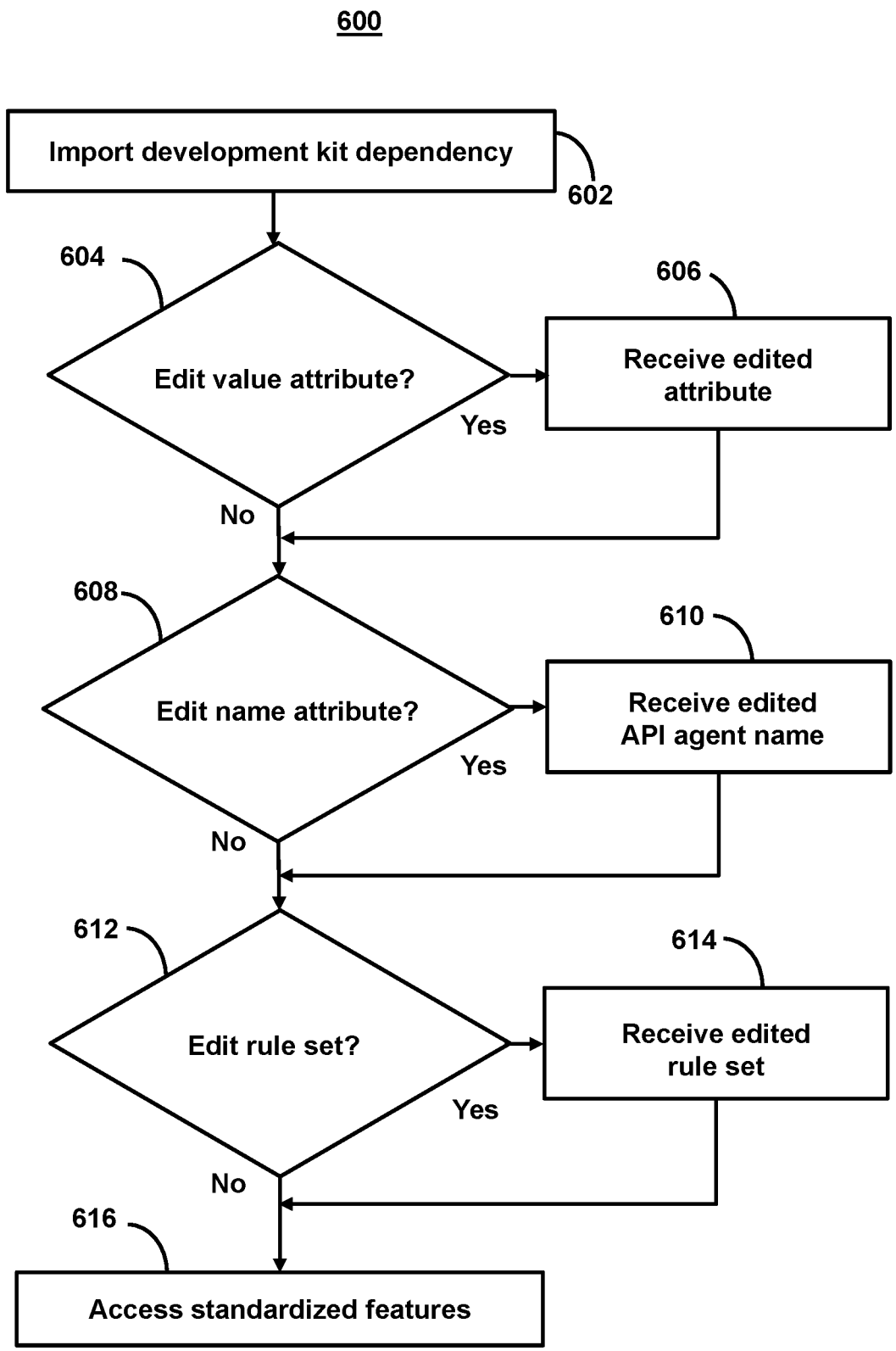
FIG. 6 shows a flowchart of the steps involved in generating an API-based agent for implementing automated controls assessment, in accordance with one or more embodiments.

FIG. 6 shows a flowchart of the steps involved in generating an API-based agent for implementing automated controls assessment, in accordance with one or more embodiments. For example, process 600 may represent the steps taken by one or more devices as shown in FIG. 2 when generating an API-based agent. For example, in some embodiments, the API-based agent may be generated via user inputs to one or more instances of a user interface (e.g., as described in FIGS. 1A-D). Furthermore, in some embodiments, the API-based agent resulting from process 600 may be used as described above in FIGS. 3-5. It should also be noted that the features of an API-based agent may be annotation based. Accordingly, users do not need to make modifications to their implemented logic to switch between capabilities.

At step 602, process 600 imports (e.g., using control circuitry of one or more components of system 200 (FIG. 2)) a development kit dependency. For example, process 600 may execute an instruction such as:

```
<dependency>
    <groupId>mcn.control-manager</groupId>
    <artifactId>capdk</artifactId>
    <version>0.2.16</version>
</dependency>
```

For example, the instruction may identify the control manager, the software development kit, and/or a version of the software development kit. For example, the development kit may include a Java library of standard assessment features.

At step 604, process 600 determines (e.g., using control circuitry of one or more components of system 200 (FIG. 2)) whether or not to edit a value attribute that defines the controls assessment audit performed by the API-based agent. In response to determining to edit a value attribute, process 600 proceeds to step 606. In response to determining not to edit a value attribute, process 600 proceeds to step 608.

At step 606, process 600 receives (e.g., using control circuitry of one or more components of system 200 (FIG. 2)) the edited value attribute. For example, the system may receive an edit to the API endpoint. For example, the system may assign the automated controls assessment audit one or more endpoints that specify how it will receive user requests. These endpoints may include delivery pathways, devices, accounts, and/or other features or applications.

At step 608, process 600 determines (e.g., using control circuitry of one or more components of system 200 (FIG. 2)) whether or not to edit a name of the API-based agent. In response to determining to edit the name, process 600 proceeds to step 610. In response to determining not to edit the name, process 600 proceeds to step 612.

At step 610, process 600 receives (e.g., using control circuitry of one or more components of system 200 (FIG. 2)) the edited name. For example, the system may receive an edit to the name of the API-based agent as it is represented, e.g., in a user interface of a control manager (e.g., as shown in instance 130 of FIG. 1C). For example, the system may assign the automated controls assessment audit a name that is used publicly to represent the given controls assessment audit.

At step 612, process 600 determines (e.g., using control circuitry of one or more components of system 200 (FIG. 2)) whether or not to edit a rule set of the API-based agent. In response to determining to edit the rule set, process 600 proceeds to step 614. In response to determining not to edit the rule set, process 600 proceeds to step 616.

At step 614, process 600 receives (e.g., using control circuitry of one or more components of system 200 (FIG. 2)) the edited rule set. For example, the system may receive an edit to the rule set that is used for the controls assessment audit. The edit may specify the control assessment logic and/or condition which needs to be evaluated to generate a given response. For example, the system may generate a response indicating a "Pass" or "Fail" of the assessment.

Additionally or alternatively, the system may define how a deviation (e.g., a record that does not pass an assessment) is defined. For example, the deviation may be defined by different categories of information. For example, for a terminated user ID assessment audit, the employee ID (e.g., "XB12345") that fails the audit may be displayed with the domain in which it failed. The deviation is then express as a combination of employee ID and the domain.

In some embodiments, the system may enable API-based agents to be dynamically updated. For example, the development kit may include a specialized field which manages dynamic rendering of front end developer features. For example, an edit to a value attribute, name, or rule set of the API-based agent may be dynamically updated as shown in a user interface (e.g., as described in FIG. 1C). Accordingly, the system may be dynamically updated without the need for updates to back end features to have corresponding updates to front end features. In some embodiments, process 600 may additionally or alternatively receive user inputs defining the area of audit and/or domains. For example, the system may define the connections with one or more data-sources against which the controls assessment audit would be run.

At step 616, process 600 accesses (e.g., using control circuitry of one or more components of system 200 (FIG. 2)) standardized features. For example, the system may use standard assessment logic that is standardized for the plurality of API-based agents and control logic that is not standardized for the plurality of API-based agents. After the system has received edits to the value attributes and/or rule sets that affect the control logic, the API-based agent may use the standardized assessment features of the system to complete the API-based agent. For example, the system may use standardized features to collection evidence.

In some embodiments, however, the API-based agent may specify how the evidence is collected (e.g., what are required details for an evidence file and/or what details are considered sufficient from an audit standpoint. For example, the API-based agent may collect voluminous evidence, make use of non-stream features to transparently observe evidence for development and testing, etc. The API-based agent may also specify whether to receive synchronous or asynchronous calls from the platform and/or aggregate the evidence data or keep it at granular level. Additionally or alternatively, the evidence collection may be specific to a technique of the development kit (e.g., in order to be specific to a firm-managed document content management system).

It is contemplated that the steps or descriptions of FIG. 6 may be used with any other embodiment of this disclosure.

In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for implementing automated controls assessment through a user interface, the method comprising: receiving a user input to generate an automated controls assessment audit; receiving an area of audit for the automated controls assessment audit; receiving a category of the automated controls assessment audit; receiving scheduling data for executing the automated controls assessment audit; determining whether the scheduling data is met; and transmitting an instruction to execute the automated controls assessment audit to an API-based agent.

2. A method for implementing automated controls assessment using an API-based agent, the method comprising: receiving a control assessment audit instruction; selecting a data source; applying control logic; and generating assessment outcome.

3. A method for generating an API-based agent for implementing automated controls assessment, the method comprising: importing a development kit dependency; receiving a user input annotating control logic of for a controls assessment audit; and access standardized features of the development kit.

4. A method for implementing automated controls assessment, the method comprising: receiving, at a first instance of a user interface of a control manager application, a first user input initiating a first automated controls assessment audit of a first audit area; determining a first domain of a plurality of computer domains corresponding to the first audit area; determining a first API-based agent of a plurality of API-based agents corresponding to the first domain for performing the first automated controls assessment audit; receiving a first response, from the first API-based agent, to the first automated controls assessment audit; processing the first response, using a library of reusable features for controls assessment audits for the plurality of computer domains, to generate a first result of the first automated controls assessment audit; and generating for display a second instance of the user interface, wherein the second instance comprises the first result.

5. The method of embodiment 4, wherein the first result comprises an outcome of the first automated controls assessment audit.

6. The method of embodiment 4 or 5, wherein the first API-based agent generates the first response based on features specific to the first API-based agent, wherein the features specific to the first API-based agent includes evidence collection, a control assessment ruleset, a data library, an action response assignment, or an aggregation indicator.

7. The method of any one of embodiments 4-6, wherein each of the plurality of API-based agents is created using a standardized software development kit.

8. The method of any one of embodiments 4-7, wherein the first response is received in a standardized response format for the plurality of API-based agents.

9. The method of any one of embodiments 4-8, wherein the first API-based agent generates the first response using standardized assessment logic that is standardized for the plurality of API-based agents and control logic that is not standardized for the plurality of API-based agents.

10. The method of any one of embodiments 4-9, wherein the first API-based agent generates the first response using standardized assessment logic that is in a first programming language and control logic that is in a second programming language.

11. The method of any one of embodiments 4-10, further comprising: receiving, at the first instance of the user interface, a second user input subscribing to the first domain for the first automated controls assessment audit; and in response to the second user input, identifying a tag corresponding to the first domain, wherein the first domain is determined to correspond to the first audit area based on the tag.

12. The method of any one of embodiments 4-11, wherein the first API-based agent comprises control logic that includes a field for managing frontend rendering of a control assessment ruleset.

13. The method of any one of embodiments 4-12, further comprising: receiving a second user input initiating a second automated controls assessment audit of a second audit area; determining a second domain of the plurality of computer domains corresponding to the second audit area; determining a second API-based agent of the plurality of API-based agents corresponding to the second domain for performing the second automated controls assessment audit; receiving a second response, from the second API-based agent, to the second automated controls assessment audit; processing the second response, using the library of reusable features for controls assessment audits for the plurality of computer domains, to generate a second result of the second automated controls assessment audit; comparing the first result and the second result; and generating for display, on a display device, a third instance of the user interface, wherein the third instance is based on the first result and the second result.

14. A tangible, non-transitory, machine-readable medium storing instructions that, when executed by a data processing apparatus, cause the data processing apparatus to perform operations comprising those of any of embodiments 1-13.

14. A system comprising: one or more processors; and memory storing instructions that, when executed by the processors, cause the processors to effectuate operations comprising those of any of embodiments 1-13.

15. A system comprising means for performing any of embodiments 1-13.

What is claimed is:

1. A non-transitory computer-readable medium storing computer program instructions that, when executed by one or more processors, effectuate operations comprising:
generating, using control circuitry, an API-based agent instance configured to be displayed on a first user interface of a control manager, the API-based agent instance being configured to create or update a first API-based agent;
receiving, using the control circuitry, at a first instance of the first user interface of the control manager, a first user input initiating a first automated controls assessment audit of a first audit area;
determining, using the control circuitry, a first computer domain of a plurality of computer domains corresponding to the first audit area;
receiving, using the control circuitry, a first response from the first API-based agent to the first automated controls assessment audit;
processing, using the control circuitry, using a library of reusable features for controls assessment audits for the plurality of computer domains, the first response to generate a first result of the first automated controls assessment audit; and
generating, using the control circuitry, for display on a display device, a second instance of the first user interface, wherein the second instance comprises the first result.

2. The non-transitory computer-readable medium of claim 1, wherein generating the API-based agent instance for the first API-based agent comprises:
dynamically rendering front end developer features.

3. The non-transitory computer-readable medium of claim 1, wherein the API-based agent instance is configured to edit at least one of: a value attribute, a name, or a rule set of the first API-based agent.

4. The non-transitory computer-readable medium of claim 1, wherein generating the API-based agent instance comprises:
receiving, using the control circuitry, a second user input to an instance of a second user interface for generating API-based agent instances, wherein the API-based agent instance is configured to create the first API-based agent based on the second user input.

5. The non-transitory computer-readable medium of claim 1, wherein generating the API-based agent instance comprises:
determining, using the control circuitry, whether one or more value attributes are to be modified, the one or more value attributes defining the first automated controls assessment audit to be performed by the first API-based agent; and
responsive to determining that a first value attribute of the one or more value attributes is to be modified, receiving, using the control circuitry, an edited value attribute for the first value attribute, wherein the first API-based agent is generated based on the edited value attribute for the first value attribute.

6. The non-transitory computer-readable medium of claim 5, wherein receiving the edited value attribute for the first value attribute comprises:
receiving, using the control circuitry, an edit to an API endpoint, wherein the first automated controls assessment audit is assigned one or more API endpoints specifying how requests are received, wherein the one or more API endpoints include the API endpoint.

7. The non-transitory computer-readable medium of claim 6, wherein the one or more API endpoints comprise at least one of: delivery pathways, devices, accounts, or applications.

8. The non-transitory computer-readable medium of claim 6, wherein the operations further comprise:

selecting one or more categories of information for defining a deviation detected within the first result of the first automated controls assessment audit.

9. The non-transitory computer-readable medium of claim 1, wherein generating the API-based agent instance comprises:
  determining, using the control circuitry, whether a rule set of the first API-based agent is to be modified; and
  responsive to determining that the rule set of the first API-based agent is to be modified, receiving, using the control circuitry, an edited rule set to be used for the first automated controls assessment audit to be performed by the first API-based agent, wherein the edited rule set indicates at least one of control assessment logic or a condition to be evaluated to generate a response to the first automated controls assessment audit, and wherein the first API-based agent is generated based on the edited rule set.

10. The non-transitory computer-readable medium of claim 1, wherein the operations further comprise:
  accessing, using the control circuitry, assessment logic standardized for a plurality of API-based agents and control logic that is not-standardized for the plurality of API-based agents wherein the assessment logic and the control logic are used to generate the first API-based agent.

11. The non-transitory computer-readable medium of claim 10, wherein the assessment logic is in a first programming language and the control logic is in a second programming language.

12. The non-transitory computer-readable medium of claim 10, wherein the control logic includes a field for managing frontend rendering of a control assessment ruleset.

13. The non-transitory computer-readable medium of claim 1, wherein generating the API-based agent instance comprises:
  receiving, using the control circuitry, a second user input to an instance of a second user interface for generating an API-based agent instance, wherein the API-based agent instance is configured to update the first API-based agent based on the second user input.

14. The non-transitory computer-readable medium of claim 1, wherein the operations further comprise:
  retrieving, using the control circuitry, a development kit dependency comprising an identification of at least one of: the control manager, a software development kit including a library of standard assessment features, or a version of the software development kit, wherein the first API-based agent is generated based on the identification of the at least one of the control manager, the software development kit, or the version of the software development kit.

15. The non-transitory computer-readable medium of claim 1, wherein the operations further comprise:
  determining, using the control circuitry, whether a name of the first API-based agent is to be modified; and
  responsive to determining that the name of the first API-based agent is to be modified, updating, using the control circuitry, a name for the first API-based agent to an edited name.

16. The non-transitory computer-readable medium of claim 1, wherein features of the first API-based agent are annotation-based such that modifications to their implemented logic do not need to be made to switch between capabilities.

17. The non-transitory computer-readable medium of claim 1, wherein the first result comprises an outcome of the first automated controls assessment audit.

18. The non-transitory computer-readable medium of claim 1, wherein the operations further comprise:
  steps for generating instances of the first user interface.

19. The non-transitory computer-readable medium of claim 1, wherein the operations further comprise:
  defining connections with one or more data sources against which the first automated controls assessment audit is to be run.

20. A method for creating API-based agents for executing automated controls assessment audits, the method being implemented by one or more processors executing computer program instructions to perform the method, the method comprising:
  generating, using control circuitry, an API-based agent instance configured to be displayed on a first user interface of a control manager, the API-based agent instance being configured to create or update a first API-based agent;
  receiving, using the control circuitry, at a first instance of the first user interface of the control manager, a first user input initiating a first automated controls assessment audit of a first audit area;
  determining, using the control circuitry, a first computer domain of a plurality of computer domains corresponding to the first audit area;
  receiving, using the control circuitry, a first response from the first API-based agent to the first automated controls assessment audit;
  processing, using the control circuitry, using a library of reusable features for controls assessment audits for the plurality of computer domains, the first response to generate a first result of the first automated controls assessment audit; and
  generating, using the control circuitry, for display on a display device, a second instance of the first user interface, wherein the second instance comprises the first result.

* * * * *

UNITED STATES PATENT AND TRADEMARK OFFICE
CERTIFICATE OF CORRECTION

| | | |
|---|---|---|
| PATENT NO. | : 11,720,680 B2 | Page 1 of 1 |
| APPLICATION NO. | : 17/539334 | |
| DATED | : August 8, 2023 | |
| INVENTOR(S) | : Uddipt Mitter | |

It is certified that error appears in the above-identified patent and that said Letters Patent is hereby corrected as shown below:

On the Title Page

Item (73) Assignee:
Please correct "THE BANK OF NEW YORK MELLON CORPORATION, New York, NY (US)" to "THE BANK OF NEW YORK MELLON, New York, NY (US)"

Signed and Sealed this
Seventh Day of November, 2023

Katherine Kelly Vidal
*Director of the United States Patent and Trademark Office*